US 6,828,751 B2

(12) United States Patent
Sadasivam et al.

(10) Patent No.: US 6,828,751 B2
(45) Date of Patent: Dec. 7, 2004

(54) INDUCTION MOTOR CONTROL SYSTEM (75) Inventors: Vinodkumar Sadasivam, St. Louis, MO (US); Darko Marcetic, St. Louis, MO (US); Joseph G. Marcinkiewicz, St. Peters, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/675,562

(22) Filed: Sep. 30, 2003

(65) Prior Publication Data
US 2004/0130287 A1 Jul. 8, 2004

Related U.S. Application Data (63) Continuation-in-part of application No. 09/880,475, filed on Jun. 13, 2001, now Pat. No. 6,636,011.

(51) Int. Cl.$^7$ ................................................. H02P 1/24
(52) U.S. Cl. ........................ 318/729; 318/799; 318/727
(58) Field of Search ................................. 318/799, 727, 318/729, 798, 802, 805, 812, 438

(56) References Cited

U.S. PATENT DOCUMENTS

| 6,468,042 | B2 | * | 10/2002 | M.o slashed.ller | ....... | 417/44.11 |
| 6,496,397 | B2 | * | 12/2002 | Sakai et al. | ................. | 363/131 |
| 6,559,619 | B1 | * | 5/2003 | Bach | .......................... | 318/729 |

* cited by examiner

Primary Examiner—Karen Masih
(74) Attorney, Agent, or Firm—Locke Liddell & Sapp LLP (57) ABSTRACT An induction motor drive system and method estimates a motor power factor based on the AC power output to the motor phase windings and estimates the rotor speed based on the estimated power factor. The estimated rotor speed is compared to a rotor speed command signal to generate a speed error, and the voltage and frequency input to the motor are adjusted in response to the speed error. Rotor speed is estimated based on estimated rotor slip, which is estimated based on the applied voltage, frequency, estimated power factor and estimated motor power.

20 Claims, 7 Drawing Sheets

INDUCTION MOTOR CONTROL SYSTEM

CROSS-REFERENCE TO RELATED APPLICATION

This application is a continuation-in-part of U.S. patent application Ser. No. 09/880,475, filed on Jun. 13, 2001, now U.S. Pat. No. 6,636,011, the entire disclosure of which is incorporated by reference herein.

BACKGROUND

1. Field of the Disclosure

This disclosure relates generally to control of a rotating electric machine, and more specifically, to a power factor-based speed regulation device and method for an inverter fed induction motor drive system.

2. Description of Related Art

Many applications for electric motors require variable speed motor operation, and to this end, various speed control solutions have been proposed. Induction motors are popular for several reasons, including high robustness, reliability, low price and high efficiency. A typical induction motor includes a stationary member, or stator, that has a plurality of windings disposed therein. A rotating member, or rotor, is situated within the stator to rotate relative thereto. In a three-phase induction motor, for example, a rotating magnetic field is established by applying three-phase sinusoidal alternating voltages to the stator windings. The rotating magnetic field interacts with the rotor windings to effect rotation of the rotor.

Power conversion systems are commonly used to provide the multiphase AC power to the induction motor for variable speed applications. An example of such a power conversion system is a DC-to-AC inverter bridge, which typically includes power semiconductor switching devices connected in a bridge formation between the DC bus lines and output terminals of the power conversion system. The switching devices are controlled to connect the power on the DC bus lines to the system output terminals in a desired pattern such that AC output signals having the desired fundamental frequency and amplitude are synthesized from the DC power on the DC bus lines. Various modulation strategies may be employed for controlling the inverter switching devices to deliver power, including sine wave Pulse-Width Modulation ("PWM").

Clothes washing machines often employ induction motors. The need to maintain washing machine drum speeds within required specifications has typically required the use of a tachometer on the motor shaft to provide a speed feedback to the motor controller. The desired speeds are achieved by controlling the excitation frequency and the corresponding voltage. Low cost speed control solutions are often implemented using constant or schedule based volts-per-hertz algorithms. Speed regulation is based on feedback from the tachometer attached to the rotor. Elimination of the tachometer, however, is desirable not only from a cost perspective, but also for reliability reasons.

The natural characteristic of the induction motor will allow the rotor speed to decrease with increasing torque load on the shaft, at constant voltage amplitude and frequency. To counter this and maintain a more constant speed, speed control methods vary the voltage and frequency to control the speed of the rotor. A secondary purpose of this is to prevent saturation of the motor stack, which will lead to over heating of the motor. Thus, control schemes used in applications where the load on the motor shaft varies over a wide range (for example, a washing machine) should be capable of applying proper stator voltage amplitude and frequency to the motor so as to maintain shaft speed and prevent over heating of the motor. Moreover, it is desirable to control the motor over a wide range of speeds.

Several solutions have been proposed for efficient operation of an induction motor based on controlling the power factor of the motor (generally, the power factor is calculated based on the phase difference between the voltage and currents). Such solutions, however, do not adequately address the requirements of a variable speed application such as that mentioned above. They are primarily designed to provide efficient operation of the motor by optimizing the power factor of the motor.

The present invention addresses shortcomings associated with the prior art.

SUMMARY OF THE DISCLOSURE

In accordance with aspects of the present invention, a control method and system for an induction motor is disclosed. The motor includes a rotor and a stator with a plurality of phase windings therein to which AC power is applied to cause rotation of the rotor relative to the stator. The control method may be stored as program instructions on a machine-readable medium and implemented by a digital controller such as a digital signal processor (DSP) chip, microcontroller or microprocessor. The control method includes receiving a rotor speed command signal and receiving an indication of the phase winding current. The motor power factor is estimated based on the current waveform, and the rotor speed is estimated based on the estimated power factor. The estimated rotor speed and the rotor speed command signal are compared to generate a speed error, and in response the speed error, a voltage signal applied to the phase windings is adjusted.

More specifically, in exemplary embodiments, the controller estimates the motor power and power factor based on the voltage input to the phase windings and the current in the phase windings. The slip speed of the motor is estimated based on the calculated power factor, calculated motor power, voltage applied, and frequency of the applied voltage. The estimated slip speed is used to calculate the rotor speed. The rotor speed is compared with the commanded rotor speed to generate a speed error. Based on this error, the voltage amplitude and frequency are adjusted to drive the speed error to zero. The estimate of rotor speed may be compensated in response to the motor temperature variation.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DISCLOSURE

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A constant slip speed in a motor ensures constant speed of the rotor at a constant input voltage frequency. Maintaining a constant slip also leads to a constant power factor operation under constant terminal voltage and frequency. This can be concluded from the equivalent circuit description of an induction motor. Thus, by estimating the power factor of the motor and varying the input voltage to the motor to maintain a constant power factor, a constant rotor slip can be maintained. Consequently, the motor will also have a constant rotor speed.

Figures 1, 2:
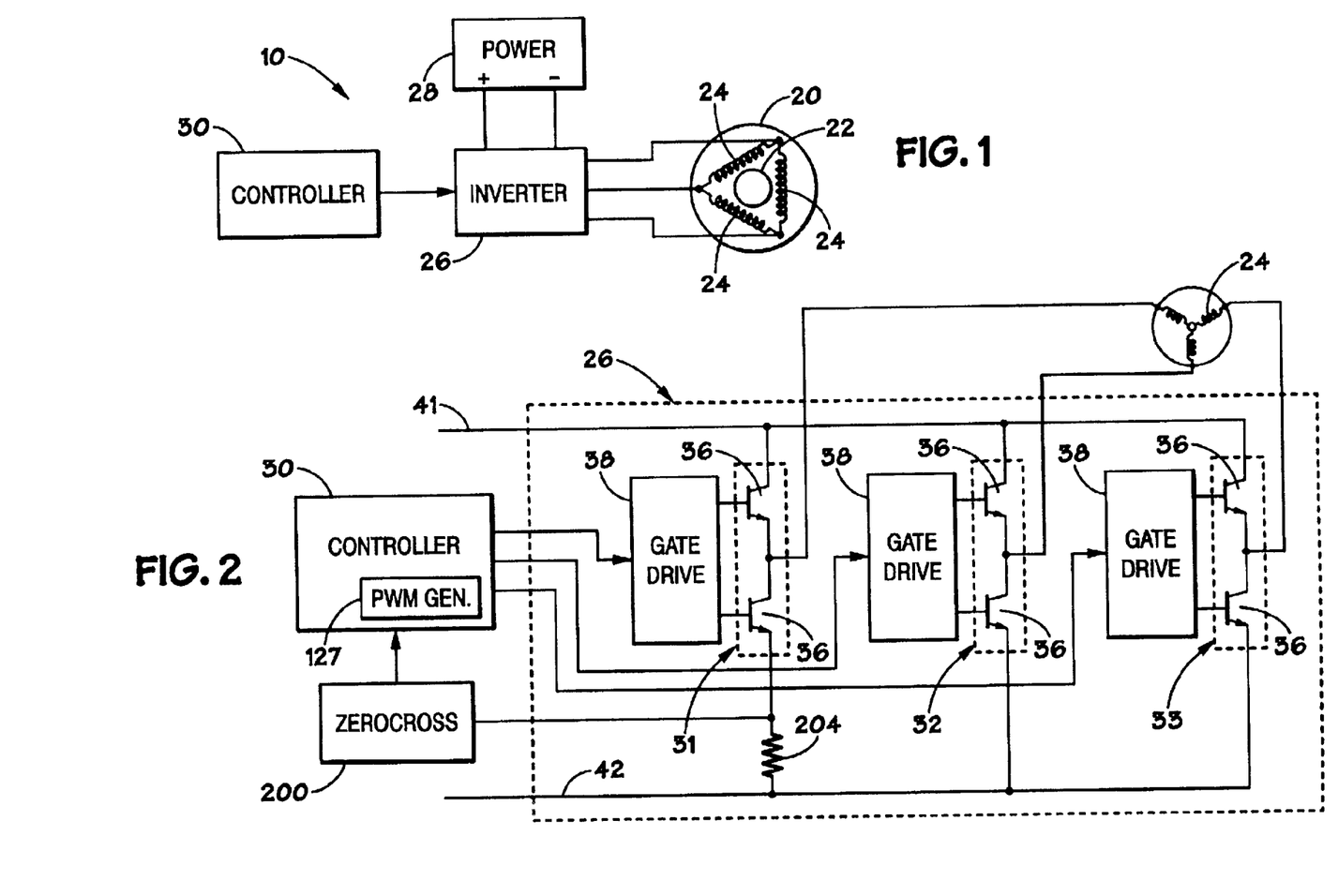
FIG. 1 is a block diagram conceptually illustrating aspects of an induction motor system.
FIG. 2 is a schematic diagram illustrating additional aspects of the inverter shown in FIG. 1.

Rather than calculate the actual power factor by determining both the actual current and voltage phase angles, the power factor angle is estimated by sensing the zero crossing of the phase current of the motor and the command voltage to the inverter bridge powering the motor in certain implementations of the invention. FIG. 1 is a block diagram of a rotating electric machine, such as a three-phase induction motor system 10, in accordance with aspects of the present invention. The motor 10 includes a stator 20 and a rotor 22. The stator 20 includes a plurality of windings 24 that receive AC power from an inverter 26. The inverter 26 receives DC power from a power source 28. A controller 30 includes a schedule of voltage and frequency constants, and provides control inputs to the inverter to vary the voltage and frequency to achieve the desired speed. The controller 30 may be implemented, for example, with any type of digital controller such as a digital signal processor (DSP) chip, microcontroller or microprocessor. An example of a suitable controller is a model ADMC328 from Analog Devices.

FIG. 2 illustrates portions of an exemplary inverter 26 in accordance with aspects of the present invention. The exemplary three-phase inverter 26 includes three inverter legs 31,32,33 corresponding to the windings 24 of the three motor phases. Each leg 31,32,33 includes upper and lower switching devices 36 connected in a bridge formation between the positive and negative lines 41,42 of the DC bus. The switching devices 36 may comprise any suitable switching device, such as bi-polar devices, power MOSFETs, IGBTs, etc.

The switching devices 36 of the three inverter legs 31,32,33 are driven by corresponding gate drivers 38 so as to connect the power on the DC bus lines 41,42 to the motor windings 24 in a desired pattern, such that AC output signals having the desired frequency and amplitude are synthesized from the DC power on the DC bus lines 41,42. In certain embodiments of the invention, PWM schemes are used for controlling the inverter switching devices 36. In the illustrated embodiment, the gate drivers 38 have inputs connected to receive the output of a PWM generator 127 implemented by the controller 30.

In known induction motor drive systems, a tachometer would typically provide an indication of the actual motor speed to the controller 30, which would compare the actual speed to a desired speed value and adjust the inputs to the motor windings 24 accordingly. However, in accordance with the present invention, the motor power factor is estimated by calculating the difference between a voltage phase angle and the phase current zero-cross angle to adjust the voltage and frequency constants, and thus, the amplitude of the voltage and the frequency applied to the motor 20.

Figure 3:
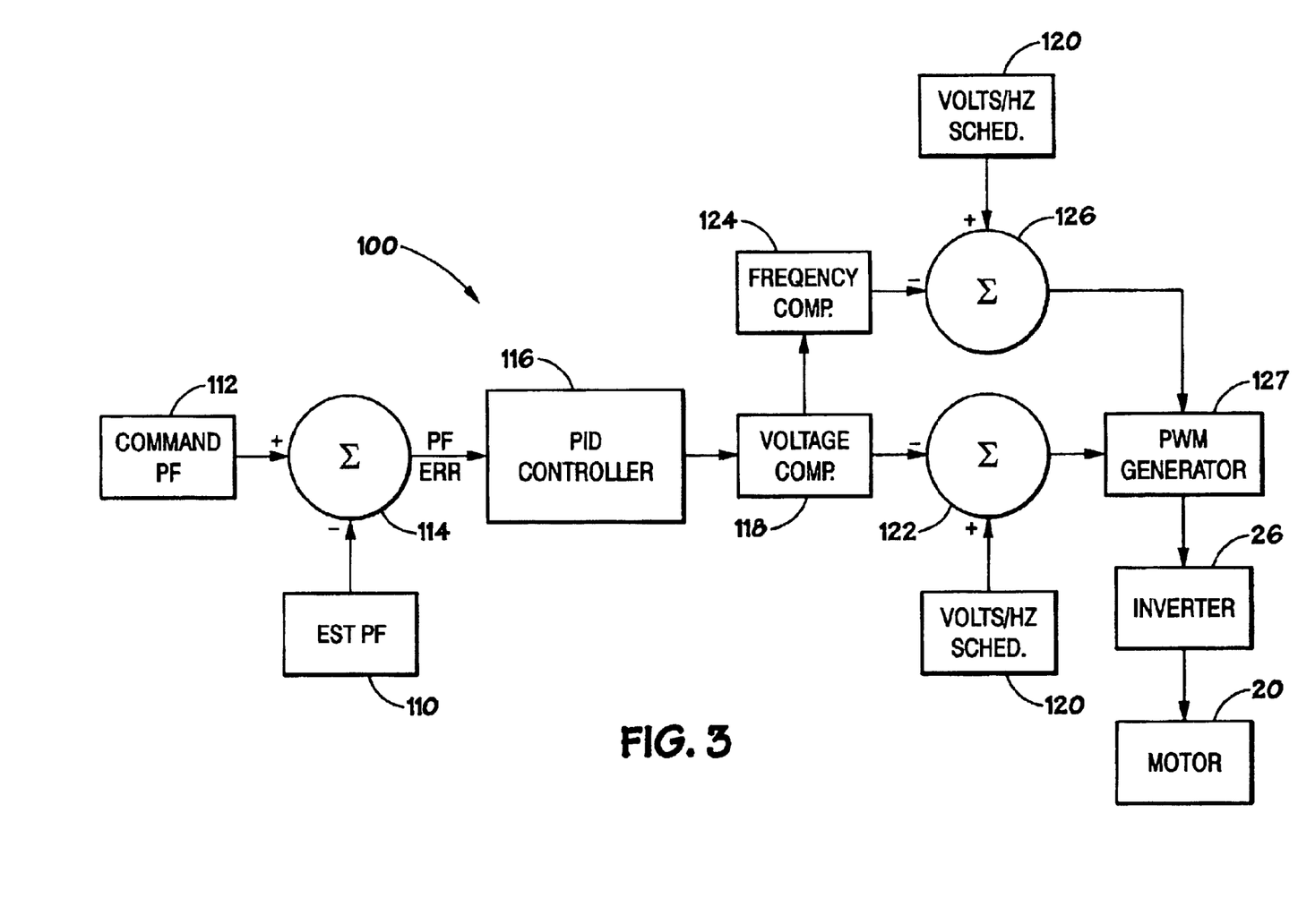
FIG. 3 is a block diagram illustrating a speed control system.

FIG. 3 is a block diagram illustrating a speed control system 100 in accordance with aspects of the present invention. In exemplary embodiments of the invention, this is implemented digitally in the controller 30. The estimated, or computed power factor angle 110 and a desired or command power factor angle 112 are input to a summing junction 114, which outputs a power factor angle error value to a controller 116, such as a proportional-integral-derivative (PID) controller. In certain embodiments, the estimated power factor angle 110 is low pass filtered to increase noise immunity. The controller 116 converts the power factor error value to a voltage compensation value 118, which may be limited to an upper and a lower limit to avoid saturation of output. This range is established so as to handle the expected load changes on the motor 20. The voltage compensation 118 is also low pass filtered in exemplary embodiments of the invention.

The voltage compensation 118 is negated with the original command voltage computed from the motor's constant volts per hertz schedule 120 at a summing junction 122. The voltage schedule 120 is derived based on motor design parameters in a known manner. The summing junction 122 outputs the corrected voltage that is applied to the PWM generator 127. The PWM 127 generator generates switching signals that are applied to the switches 36 of the inverter 26. In this manner, the power factor angle is regulated to a command angle by varying the terminal voltage to the motor 20.

By varying the amplitude of the voltage applied to the motor windings 24 to maintain constant power factor, the slip and thus the speed of the motor 20 is regulated to a near constant value. Based on the voltage compensation 118, input frequency may also be varied to provide additional speed regulation at certain load conditions. The input frequency to the motor 20 is increased for all positive errors fed into the controller 116 and decreased for all the negative errors. Hence, at light loads the input frequency to the motor will decrease enough to provide constant speed operation of the motor. The voltage compensation 118 is converted to a frequency compensation value 124, for example, by applying a gain factor thereto. The frequency compensation 124 is applied to the input frequency in a summing junction 126 to provide an adjusted frequency to the motor 20.

The frequency adjustment at certain load conditions is effective in further regulating the speed of the motor 20.

Thus, for a configured load point, near zero speed regulation is achieved for load variations on the motor shaft. Moreover, in further embodiments of the invention, the frequency and voltage inputs may be compensated for temperature variations. Temperature of the motor may be estimated, for example, by measuring the stator resistance. Stator resistance is estimated by applying DC voltages to the motor phases for short intervals of time. Based on the estimated stator resistance, voltage and frequency compensation is calculated and applied to the motor.

To calculate the estimated power factor 110, the current zero-cross instants are determined using a zero-cross detection circuit 200. Referring to FIG. 2, a resistor 204 is included between the lower switching device 36 of one of the inverter leg 31 and the negative DC bus 42. Using a single inverter leg, such as inverter leg 31, to determine the zero-cross angle greatly simplifies the circuitry required to implement the current zero-cross detection, though any or all of the inverter legs 31,32,33 may be used for the zero crossing detection. The current zero crossing is determined by the zero-cross detection circuit 200, then provided to the controller 30 to calculate the power factor angle. In this implementation scheme a level change in the signal is used to signify the zero cross of the phase current, though other schemes for detecting the zero crossing are contemplated, such as through use of the PWM signals.

Figure 4:
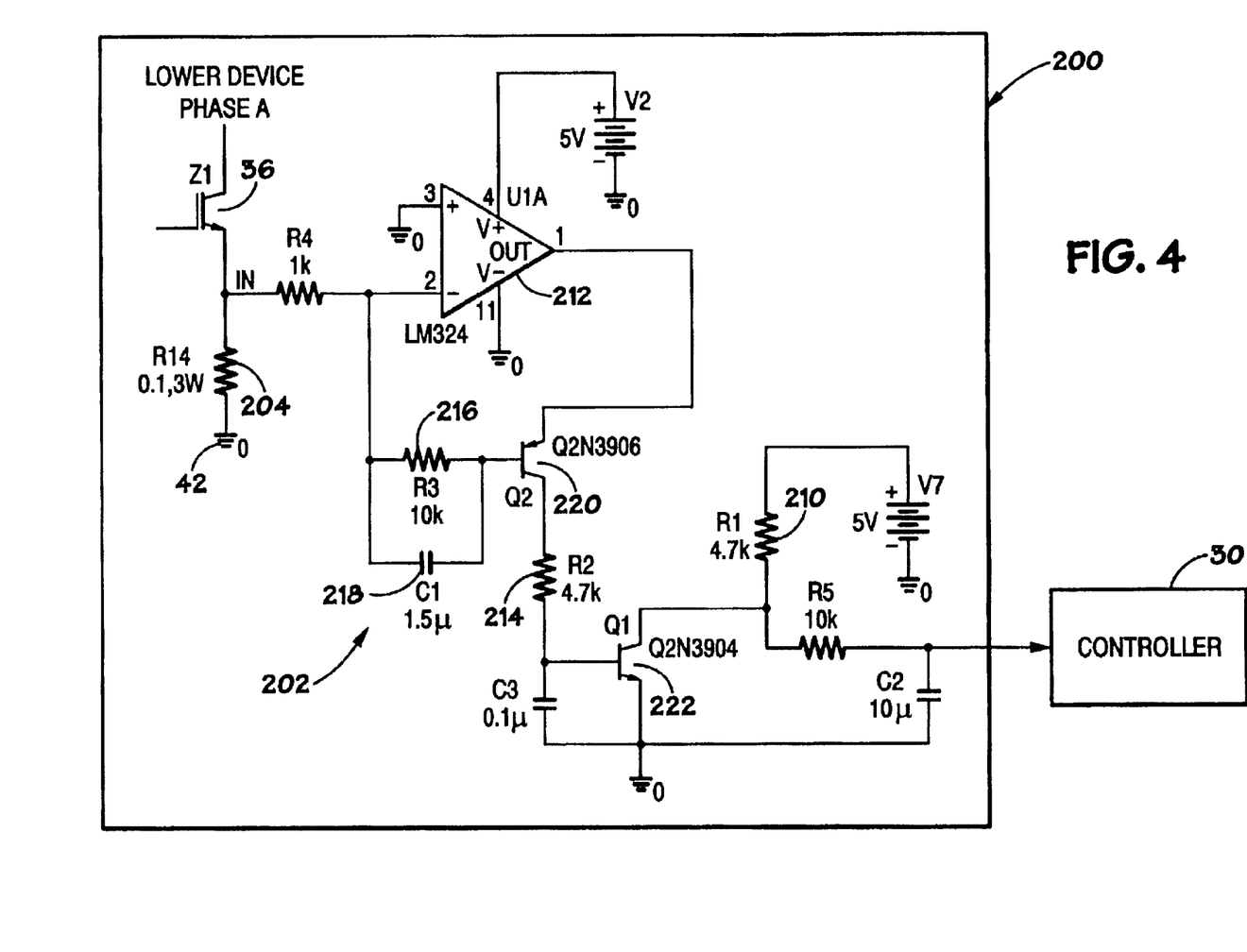
FIG. 4 is a schematic diagram illustrating a phase current zero-cross angle detection circuit.

FIG. 4 is a schematic diagram of a zero-cross detection circuit 200 in accordance with an embodiment of the present invention. As noted above, the resistor 204 is included between the lower switching device 36 of one of the inverter legs 31,32,33 and the negative DC bus 42. For sake of simplicity, the first inverter leg 31 is referenced in this description, though any of the inverter legs 31,32,33 could be used for this purpose.

The signal obtained from the resistor 204 is fed to conditioning circuitry 202 that produces a square wave type output signal based on the zero crossing of the phase current. The output is connected to the controller 30. In one embodiment, the output is connected to a level sensitive interrupt pin on the DSP implementing the controller 30, providing an output edge to the DSP each time the current crosses zero. The phase angle is stored in the DSP memory when interrupted. To increase the noise immunity in one embodiment, the interrupt is enabled only for 60° before and after the zero crossing of the phase command voltage. This window of operation works effectively for most of the practical working conditions of the drive system.

The conditioning circuitry 202 functions by converting the current flowing in the inverter phase leg 31 to a voltage signal using the current shunt resistor 204. The first step in processing the signal is to buffer the signal from the resistor 204 and remove the high frequency PWM switching noise. In the illustrated circuit 202, this is accomplished using an operational amplifier 212, two resistors 214, 216, and a capacitor 218 in an inverting opamp filter configuration. A PNP transistor 220 is inserted in the feedback path of the opamp 212 to differentiate between the positive portion of the phase current and the negative portion of the phase current. This is accomplished using the inherent base emitter diode in the PNP transistor 220. When the voltage across the current shunt resistor 204 becomes positive, the voltage at the output of the opamp 212 is pulled down which turns off the transistor 220. Alternatively, when the voltage across the current shunt resistor 204 becomes negative, the transistor 220 is turned on.

An NPN transistor 222 translates the current flowing in the transistor 220 into a logic level voltage signal, which can be read by the controller 30. When the PNP transistor 220 is ON, current flows in the base of transistor 222, which turns it ON and produces a low-level signal at the input of the controller 30. When transistor 220 is OFF, transistor 222 turns off which produces a high level signal at the input of the controller 30. The final result of the circuit 202 is to turn the bipolar sinusoidal current waveform following in the shunt resistor 204 into a logic level signal with transitions at the current zero crossing points.

Estimation of power factor angle is the second step in implementing this algorithm. By definition, the power factor angle is the phase difference between the phase current and terminal voltage of the motor. Since the PWM algorithm accurately reproduces the commanded voltage, the generated phase angle in the controller is used in this computation. By using the voltage phase angle and the sensed zero crossing instant of the current, the power factor angle can be computed. Once the zero-cross angle of the current is sensed, the difference between this angle and the zero-cross angle of the voltage is computed to get the power factor angle. This power factor angle is low pass filtered to increase noise immunity and to avoid sudden changes in the command voltage of the motor. The filtering may be done by any acceptable means—the power factor angle is low pass filtered by software in one exemplary embodiment. This results in a cost effective control scheme for power factor angle estimation.

In accordance with further exemplary embodiments of the invention, the slip estimate is enhanced by including the stator voltage variation in the estimation process. Power factor is estimated using the current signals from all the three phases. This higher bandwidth helps achieve higher performance. Also, more variables are used in estimating the rotor slip to improve the slip estimates.

By sensing motor currents on all three phases and with the knowledge of the voltage applied to the motor, the power factor of the motor is estimated. The estimated power factor, estimated stator voltage and stator frequency are used to estimate the slip of the motor using a three-dimensional lookup table. The estimated slip is used in the control scheme to provide motor speed feedback to the speed controller, thus eliminating the need for the tachometer.

Figure 5:
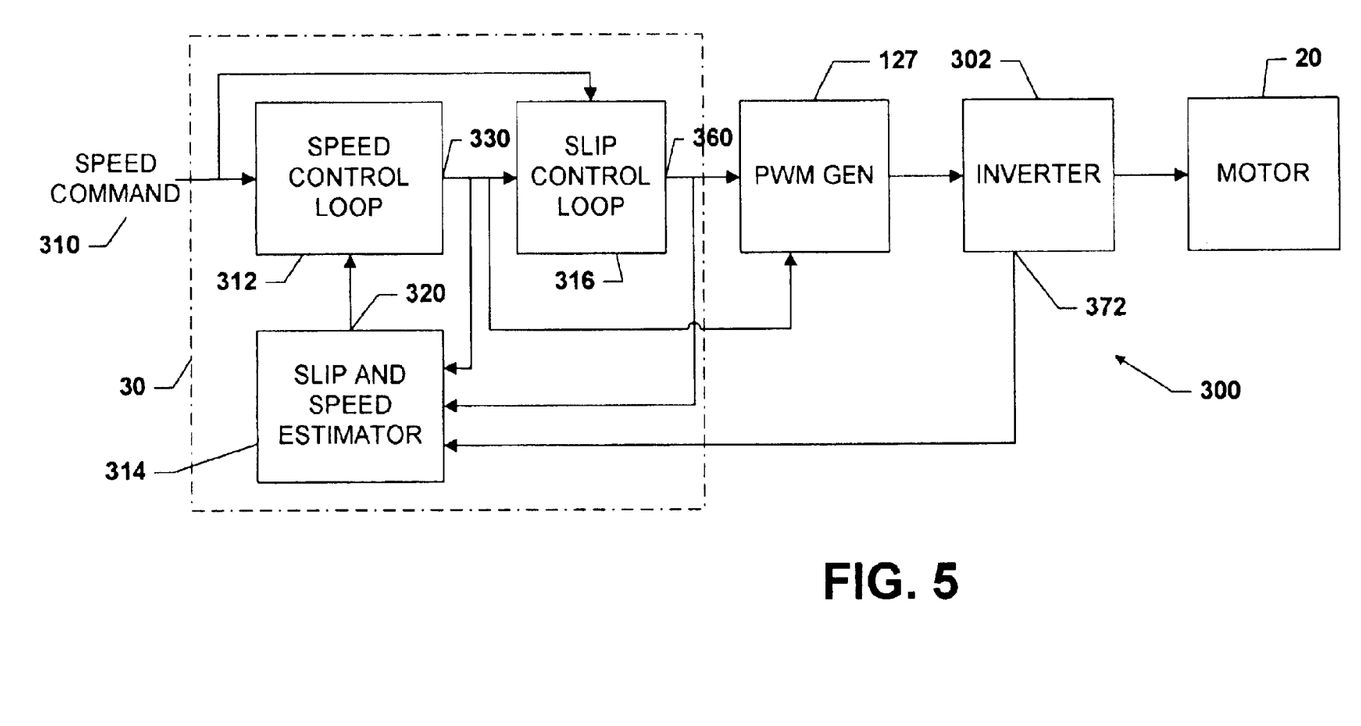
FIG. 5 is a block diagram illustrating an induction motor system.

FIG. 5 is a block diagram conceptually illustrating a sensorless induction motor system 300 in accordance with exemplary embodiments of the invention. The motor system 300 includes an induction motor 20 and an inverter 302, which provides AC power to the windings (not shown in FIG. 5) of the motor 20. A controller 30 outputs control signals to the inverter 302 such that the motor 20 is operated in a desired manner. More specifically, the controller 30 of the system 300 receives a speed command signal 310, and in response thereto, controls the inverter 302 so that the voltage amplitude and frequency applied to the terminals of the motor 20 results in it being operated at the desired speed. The controller includes a speed control loop 312, a slip and speed estimator 314, a slip control loop 316 and a PWM generator 127.

Figure 6:
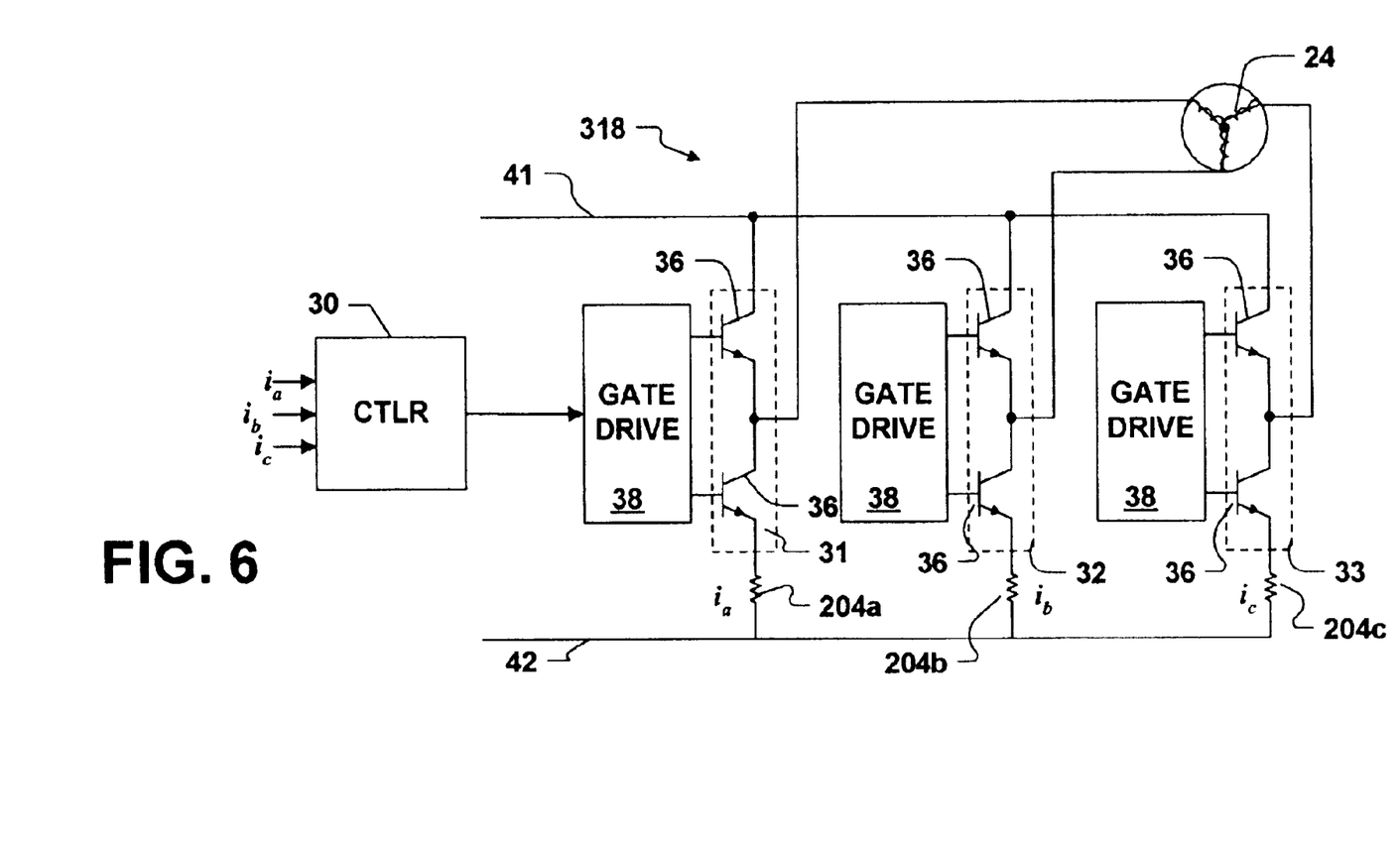
FIG. 6 is a schematic diagram illustrating additional aspects of the inverter shown in FIG. 5.

FIG. 6 is a circuit diagram illustrating portions of an exemplary inverter 302. As with the inverter 26 shown in FIG. 2, the inverter 302 includes three inverter legs 31,32,33 corresponding to the windings 24 of the three motor phases. Each leg 31,32,33 includes upper and lower switching devices 36 connected in a bridge formation between the positive and negative lines 41,42 of the DC bus. Again, the switching devices 36 may comprise any suitable switching device. The switching devices 36 are driven by corresponding gate drivers 38, and PWM schemes may be used for controlling the inverter switching devices 36. Resistors 204a,204b,204c are connected between the lower switching devices 36 of the corresponding inverter legs 31,32,33. The resistors 204a,204b,204c are used, for example, to sense the phase currents $i_a$, $i_b$, and $i_c$, which are fed back to the controller 30.

Referring back to FIG. 5, the speed control loop 312 receives the speed command signal 310 and compares it to an estimate of the actual rotor speed 320 to calculate a speed error. A motor frequency command signal 330 is output by the speed control loop 312 in response to the speed error. The rotor slip and speed estimator 314 provides the estimated rotor speed 320 based on an estimate of slip, which is determined based on the motor frequency command signal 330, a voltage amplitude command signal 360, and feedback 372 from the inverter 302. The voltage amplitude command signal 360 is output by a slip control loop 316, which determines a reference slip value based on the speed command signal 310 and compares the reference slip to the estimated slip to calculate a slip compensation.

Figure 7:
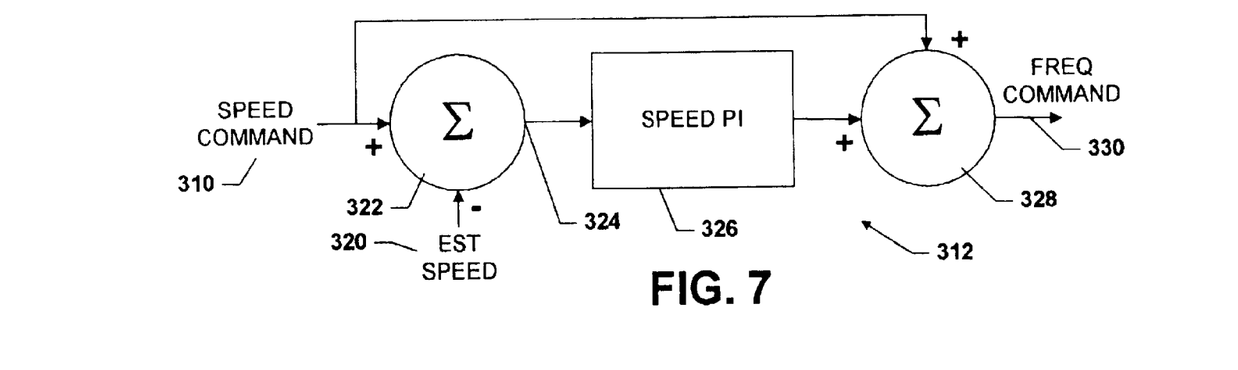
FIG. 7 is a block diagram showing additional elements of the speed control loop of FIG. 5.

The speed control loop 312 is shown in further detail in FIG. 7. The speed control loop 312 controls the motor frequency command signal 330. The speed command signal 310 and the estimated rotor speed 320 are input to a summing junction 322 to generate a speed error 324. The speed error 324 from the summing junction 320 is fed as an input to a speed PI controller 326. The output of the PI controller 326 is summed with the speed command signal 310 at a summing junction 328, resulting in the motor frequency command signal 330.

Figure 8:
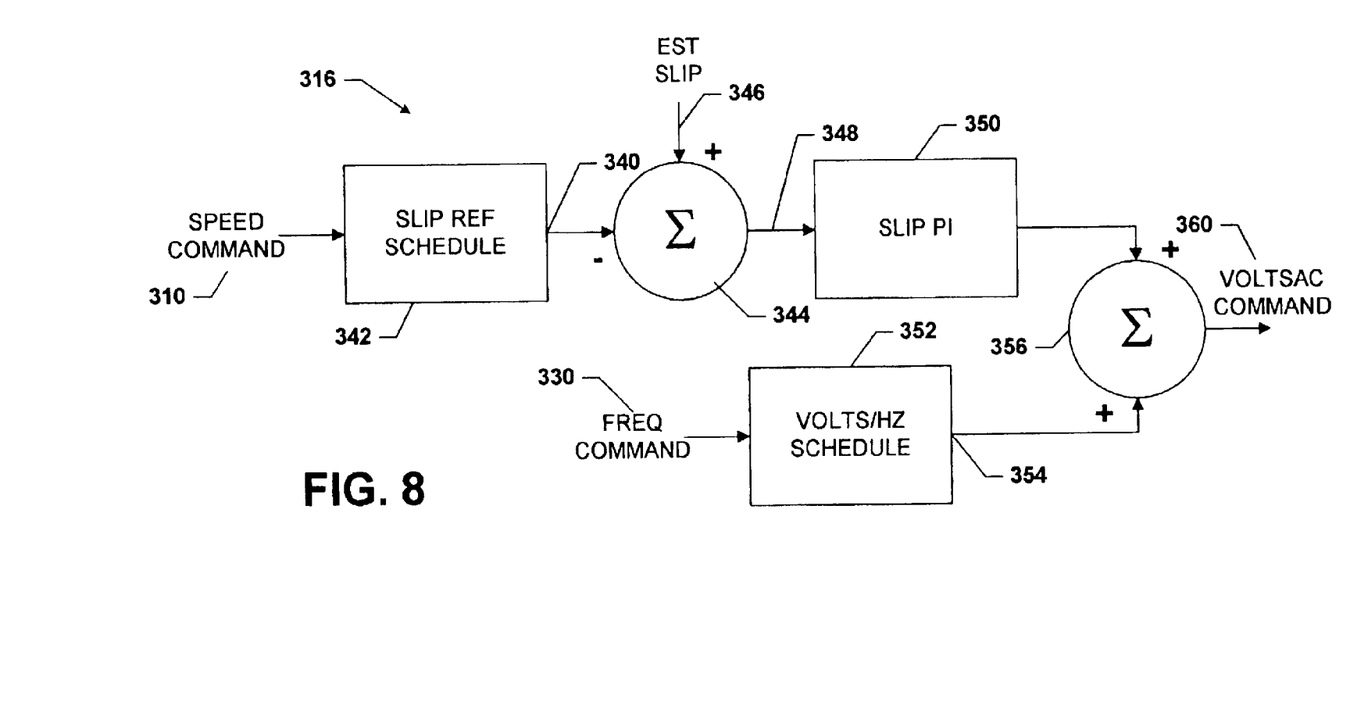
FIG. 8 is a block diagram showing additional elements of the slip control loop of FIG. 5.

FIG. 8 conceptually illustrates the slip control loop 316, which controls the voltage amplitude signal 360 applied to the motor. An optimal reference slip value 340 is generated based on the speed command signal 310 using a predetermined slip reference schedule 342. The slip reference schedule 342 is generated based on the optimal efficiency of the motor at various operating speeds. The reference slip 340 is input to a summing junction 344, along with the estimated slip 346 from the slip estimator 314. The error 348 between the reference slip 340 and the estimated slip 344 is fed as an input to a slip PI controller 350. The motor voltage frequency command signal 330 from the speed control loop 312 is used to index a Volts/Hz schedule 352, which outputs a voltage value 354. This voltage output 354 is summed with the output of the slip PI controller 350 at a summing junction 356. The output of the summing junction 338 is the voltage amplitude command signal 360.

Figure 9:
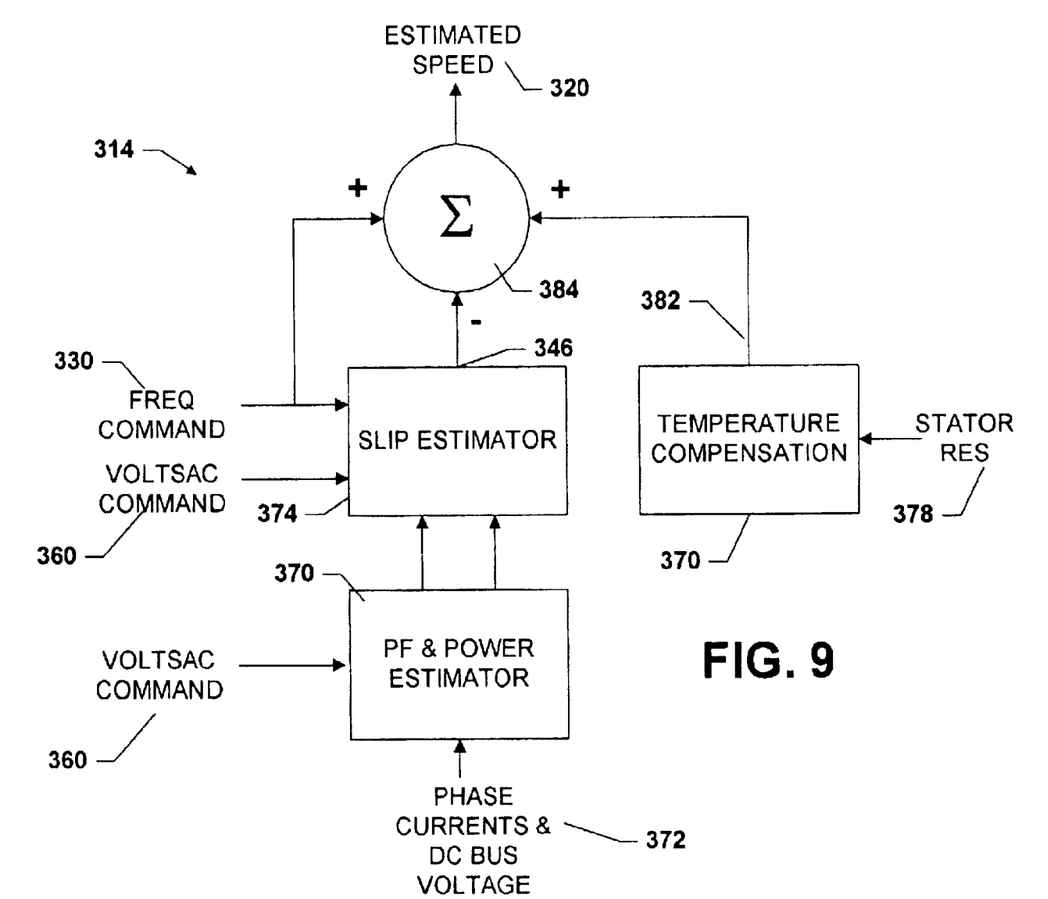
FIG. 9 is a block diagram showing additional elements of the power factor and power estimator of FIG. 5.

The slip and rotor speed estimator 314 is shown in FIG. 9, including a power factor and power estimator 370, which receives phase current, phase reference voltage and DC bus voltage information 372 as inputs. The power factor and the power are estimated from the sensed inverter leg currents, the sensed inverter DC bus voltage and input voltage command to the motor.

The power factor is calculated from the reactive power (Qpower) and real power (Ppower) to the motor as follows:

$$pf = \cos\left(a\tan\left(\frac{Q\_power}{P\_power}\right)\right)$$

The reactive and real power to the motor are calculated from the two axis coordinate system currents. The two axis system currents $I_\alpha$ and $I_\beta$, and voltages $V_\alpha$ and $V_\beta$, are calculated from the three phase variables as follows:

$$\begin{bmatrix} F\alpha \\ F\beta \end{bmatrix} = \begin{bmatrix} 1 & 0 & 0 \\ 0 & \frac{1}{\sqrt{3}} & \frac{-1}{\sqrt{3}} \end{bmatrix} \begin{bmatrix} Fa \\ Fb \\ Fc \end{bmatrix}$$

The reactive and real power are calculated as shown below. Corrections are made to the real power to account for inverter losses by substracting a constant value $P_{loss}$.

$$P\_power = I\alpha * V\alpha + I\beta * V\beta - P_{loss}$$

$$Q\_power = I\alpha * V\beta - I\beta * V\alpha$$

The terminal variables (phase currents and voltages) are calculated from the sensed leg variables as shown below $$\begin{bmatrix} Fa \\ Fb \\ Fc \end{bmatrix} = \begin{bmatrix} Fa\_leg - Fb\_leg \\ Fb\_leg - Fc\_leg \\ Fc\_leg - Fa\_leg \end{bmatrix}$$

As noted above, PWM schemes are typically used for controlling the inverter switching devices. The terminal voltages are estimated as below from the inverter bus voltage, duty cycle of the current switching cycle and the leg current for the corresponding phase.

$$V abc\_leg = V abcn\_ref - \Im(ileg\_abc, DC\_abc, Vbus)$$

$V_{abc\_leg}$ is the instantaneous voltage vector at the terminals of the motor, $V_{abcn\_ref}$ is the commanded terminal voltage vector of the motor, $I_{abc\_leg}$ is the instantaneous phase current vector of the motor, and $DC_{abc}$ is the duty cycle vector for each phase of the motor.

The voltage drop associated with the inverter switching devices and sensing resisters are accounted for as below.

$$\Im(ileg\_abc) = \begin{cases} ileg\_abc < 0 \Rightarrow DC\_abc * (Vbus - V\_igbt - V\_diode) - V\_shunt - V\_igbt \\ ileg\_abc > 0 \Rightarrow DC\_abc * (Vbus - V\_igbt - V\_diode) - V\_shunt - V\_diode \end{cases}$$

A slip estimator 374 estimates the slip of the induction motor from the voltage amplitude command 360, the voltage frequency command 330, power factor, and real power of the motor. Real power and power factor of the motor are estimated by the power factor and power estimator 370 using the above equations. The slip estimator 374 includes a set of polynomials that are formulated with input variables as its independent variable of the form shown below.

$$\Im(x) = \sum_{i=0}^{n} a_i * x^i$$

Separate polynomial functions are used for each input variable: power factor, power, voltage amplitude command 360, and the frequency command signal 330, which are provided as inputs to the slip estimator 374 from the power and power factor estimator 374. The slip estimates are obtained as a product of the polynomials as shown below.

$$\hat{\omega}_{slip} = \Im(x_1) * \Im(x_2) * \Im(x_3)$$

In exemplary embodiments, the motor's operational speed is divided into three operational ranges:
Low Speed Region
Medium Speed Region
High Speed Region Each of these regions has its separate coefficient sets that are designed for them. The independent variables used in those regions are picked to yield good correlation with the actual slip of the motor. For example, in the low speed (less than 1350 rpm) and medium speed (1350–4020 rpm) regions, the independent variables used were power factor, frequency and voltage. In the high speed region (greater than 4020 rpm), power, frequency and voltage were used.

Coefficients of these polynomials were designed based on data collected by characterizing the motor. A recursive least squares (RLS) based algorithm was used to calculate the coefficients of the polynomials from the data points. Data corresponding to the generating region of the motor may also be used in designing these polynomials if the system is required to operate in the generating mode. A weighing scheme may be used to transition between speed regions.

Since the motor parameters change with temperature, the designed polynomials may fail to yield accurate slip estimates as motor temperature varies. Accordingly, in certain implementations, the estimates are corrected for changing temperatures in the temperature compensation block 376. Data collected from temperature tests were used to design a simple correction algorithm for slip. As it is undesirable to use extra hardware to measure temperature itself, the stator resistance measurement 378 can be used indirectly determine temperature.

The frequency command signal 330, the estimated slip 346 and a temperature compensation factor 382 are provided as inputs to a summing junction 384. The output of the summing junction 382 is the estimated rotor speed 320, which is provided as inputs to the speed control loop 312.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for controlling an induction motor, the motor having a rotor and a stator including a plurality of phase windings therein to which AC power is applied to cause rotation of the rotor relative to the stator, the method comprising:

receiving a rotor speed command signal;
receiving an indication of the phase winding current;
estimating a power factor based on the phase winding current;
estimating the rotor speed based on the estimated power factor;
comparing the estimated rotor speed and the rotor speed command signal to generate a speed error; and
adjusting a voltage signal applied to the phase windings in response to the speed error.

2. The method of claim 1, further comprising:
estimating a motor power value; and
estimating a slip value in response to the estimated power factor and power;
wherein the rotor speed is estimated based further on the estimated slip value.

3. The method of claim 2, wherein an inverter applies the voltage signal to the phase windings, further comprising:
determining a reference slip based on the rotor speed command signal; and
comparing the reference slip to the estimated slip to calculate a slip error;
wherein adjusting the voltage signal applied to the phase windings includes adjusting a voltage amplitude command signal received by the inverter in response to the slip error.

4. The method of claim 3, wherein adjusting the voltage signal applied to the phase windings includes adjusting a voltage frequency command signal received by the inverter in response to the speed error.

5. The method of claim 3, further comprising estimating the voltage applied to each of the phase windings, wherein the power factor and the motor power value are estimated based on the phase winding current, the voltage applied to each of the phase windings and the voltage amplitude and frequency signals.

6. The method of claim 5, wherein the inverter includes a DC bus having positive and negative lines and a plurality of inverter legs connected between the positive and negative lines corresponding to the phase windings, and wherein the voltage applied to each of the phase windings is estimated further in response to the DC bus voltage and the inverter leg current for the corresponding phase winding.

7. The method of claim 2, further comprising adjusting the estimated slip value in response to temperature.

8. An induction motor system, comprising:
a stator;
a rotor situated relative to the stator to rotate relative to the stator;
a plurality of phase windings situated within the stator;
a power source connected to the windings to output AC power thereto;
a controller connected to the power source, the controller estimating a power factor based on the AC power output to the windings and estimating the rotor speed based on the estimated power factor, comparing the estimated rotor speed to a rotor speed command signal to generate a speed error, and adjusting AC power in response to the speed error.

9. The induction motor system of claim 8, wherein the controller estimates a motor power value and estimates a slip value in response to the estimated power factor and power, wherein the rotor speed is estimated based further on the estimated slip value.

10. The induction motor system of claim 9, wherein the power source includes an inverter that applies a voltage signal to the phase windings, and wherein the controller determines a reference slip based on the rotor speed command signal;

compares the reference slip to the estimated slip to calculate a slip error; and adjusts a voltage amplitude command signal output to the inverter in response to the slip error.

11. The induction motor system of claim 10, wherein the controller adjusts a voltage frequency command signal output to the inverter in response to the speed error.

12. The induction motor system of claim 10, wherein the controller receives signals indicating the phase winding current, and wherein the power factor and the motor power value are estimated based on the phase winding current and the voltage applied to each of the phase windings and the voltage amplitude and frequency signals.

13. The induction motor system of claim 12, wherein the inverter includes a DC bus having positive and negative lines and a plurality of inverter legs connected between the positive and negative lines corresponding to the phase windings, and wherein the voltage applied to each of the phase windings is estimated further in response to the DC bus voltage and the inverter leg current for the corresponding phase winding.

14. The induction motor system of claim 9, wherein the controller adjusts the estimated slip value in response to temperature.

15. An drive system for an induction motor including a rotor and a stator including a plurality of phase windings therein, the drive system comprising:

a rotor speed estimator outputting an estimate of rotor speed and rotor slip;

a speed control loop receiving a speed command and the estimate of rotor speed, and generating a speed error in response to the difference between the speed command and the estimate of rotor speed, the speed control loop outputting a voltage frequency command in response to the speed error; and a slip control loop determining a reference slip and receiving the estimate of rotor slip and the voltage frequency command, the slip control loop generating a slip error in response to the difference between the reference slip and the estimate of rotor slip, and outputting a voltage amplitude command in response to the slip error and the voltage frequency command.

16. The drive system of claim 15, wherein the rotor speed estimator estimates the rotor slip in response to an estimate of the motor power factor and power, and the voltage frequency and voltage amplitude commands.

17. The drive system of claim 16, wherein the power factor and power are estimated in response to the voltage and current applied to the phase windings.

18. The drive system of claim 15, wherein the estimate of rotor speed is adjusted in response to the motor temperature.

19. The drive system of claim 18, wherein the motor temperature is estimated based on an estimate of stator resistance.

20. The drive system of claim 15, wherein the rotor slip is estimated based on the product of a plurality of polynomials.

* * * * *